Feb. 3, 1931.   A. W. PLACE   1,790,677
UNIVERSAL JOINT
Filed Jan. 13, 1928
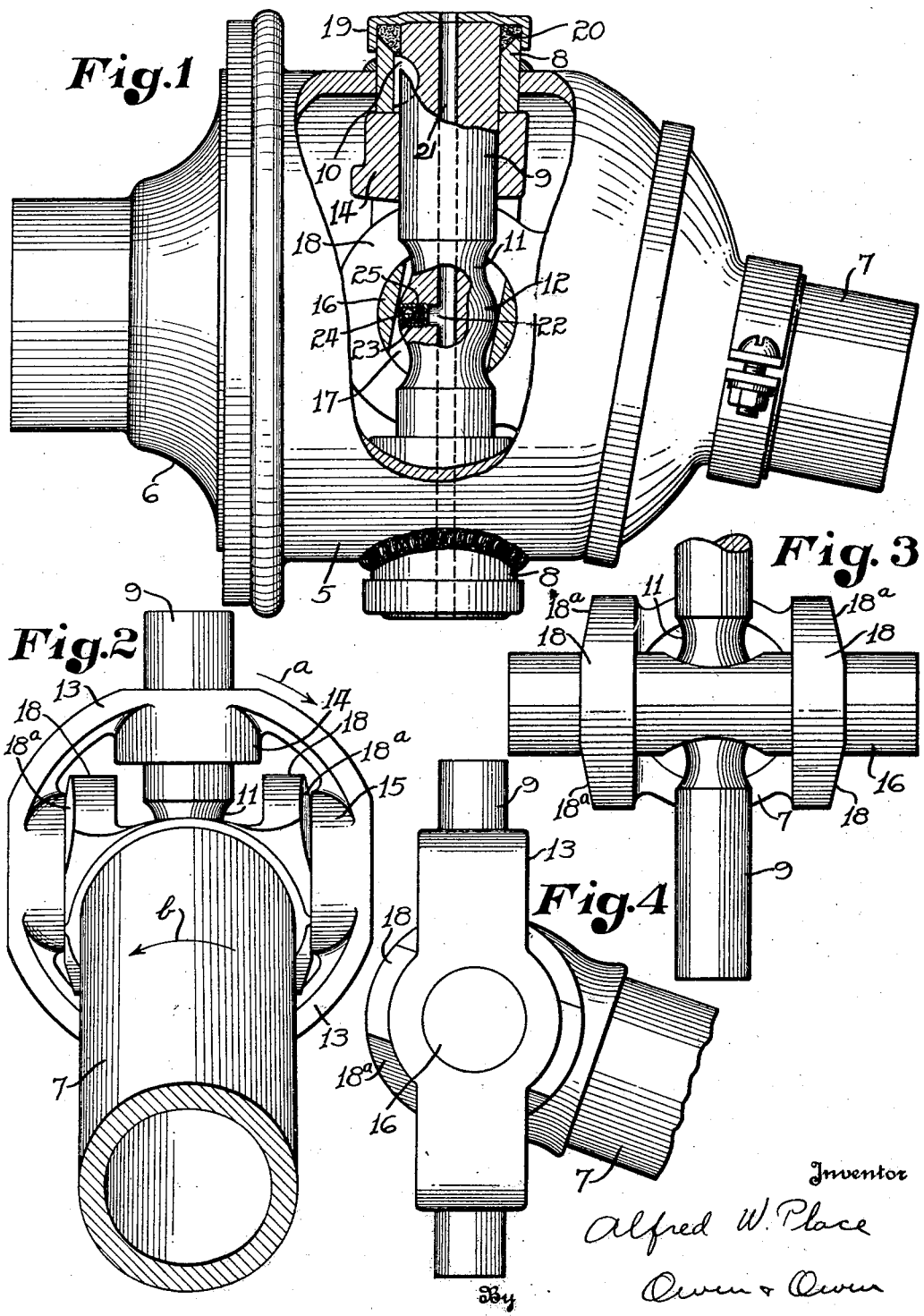
Inventor
Alfred W. Place
By Owen & Owen
Attorneys Patented Feb. 3, 1931

1,790,677

UNITED STATES PATENT OFFICE

ALFRED W. PLACE, OF BOWLING GREEN, OHIO, ASSIGNOR TO THE SUPERIOR UNIVERSAL PRODUCTS COMPANY, OF BOWLING GREEN, OHIO, A CORPORATION OF OHIO

UNIVERSAL JOINT

Application filed January 13, 1928. Serial No. 246,408.

In the type of universal joint commonly used to connect two rotating shaft sections which are disposed at an angle to each other, it often happens, when the shaft is rotated rapidly under a heavy load, that the joint gets so hot that parts of the joint actually melt and freeze together, even when the joint is full of lubricant. It has been found that this heating is due to friction caused by excessive pressure of the yoke against the ring or spider in which the yoke pin is mounted, as the yoke oscillates on the yoke pin.

One of the objects of the present invention is to eliminate this excessive pressure and friction between the yoke and the adjacent surfaces, and the resultant heating, by so constructing the yoke as to provide a clearance at the points where the greatest pressure would otherwise occur, while still maintaining a close fit between the yoke and the ring or spider, so as to prevent any looseness and to hold the two shaft sections always in the same plane.

Another object of the invention is to provide a relief valve, which will open and permit the escape of oil from the joint, whenever a predetermined pressure is reached in forcing oil into the joint. This condition occurs when the housing is somewhat more than half full of oil. Then, when the joint is operating, centrifugal force will carry the oil away from the valve, so that no more oil will escape.

The specific construction of the invention and the advantages resulting therefrom will be more particularly explained in connection with the accompanying drawings, in which—

Figure 1 is a side elevation of a joint constructed according to the invention, with portions broken away and shown in section.

Fig. 2 is an end elevation of the joint, with the housing removed, as viewed from the right of Fig. 1.

Fig. 3 is an elevation viewed from the opposite end, with the ring omitted.

Fig. 4 is an elevation as viewed from the left of Fig. 2.

As shown in the drawings, the joint is enclosed by a housing 5 having a flange 6 connected to one end and adapted to be secured to one of the shaft sections, while at the other end of the housing is a yoke member 7 adapted to be secured to the other shaft section. This yoke member has a universal angulai movement with respect to the housing. The connection between the housing 5 and the yoke member 7 is such as to prevent the escape of lubricant from the housing.

The housing 5 is provided at diametrically opposite points with bearing bushings 8, secured by electric welding or otherwise, in side openings provided in the housing. A cross pin 9 is mounted in the bushing 8 and is secured against turning movement therein by a key 10. This pin has its central portion reduced, as shown at 11, and is provided centrally of such portion with a rounded bearing flange 12. A ring 13 is mounted for rocking movement on the cross pin 9, having diametrically opposed bearing portions 14 for this purpose, and midway between the bearing portions 14 and at right angles thereto, the ring is provided with bearings 15 in which a yoke pin 16 is journaled. This yoke pin 16 is larger than the cross pin 9 and is provided with a transverse opening 17 through which the pin 9 extends. The axes of the two pins 9 and 16 therefore intersect at the center of the housing and the pin flange 12 has a supporting bearing on the surfaces which form the sides of the opening 17, permitting the two pins to have relative universal rocking movements.

The yoke member 7, as is customary in joints of this character, has its inner end disposed within the housing 5 and formed with opposed ears 18 which straddle the cross pin 9 and are mounted on the yoke pin 16, such mounting being preferably fixed so that the yoke pin 16 rocks within the ring 13 instead of within the yoke ears.

There is just sufficient clearance between the ears 18 and the inner surfaces of the bearing portions 15 to permit a free rocking movement of the yoke member 7 in the ring 13 without undue looseness. This clearance will usually be from four thousandths to seven thousandths of an inch. When the joint is operating at an angle, as shown in the drawings, and the ring 13 is turning, say, in the direction indicated by the arrow $a$, there will be a torsional resistance exerted by the yoke member 7 in the direction indicated by the arrow $b$. Owing to the slight movement of the yoke pin 16 in the bearing hole in the ring there is a tendency for the ears 18 of the yoke to exert considerable pressure at diagonally opposite points against the inner surfaces of the bearing portions 15 of the ring. It has been found that when the joint is disposed at an angle and rotating rapidly under a heavy load the friction may be so great as to actually melt the metal even though the joint is full of oil. In order to obviate such a condition I have slightly beveled the outer faces of the ears 18, as indicated at 18$^a$. In actual practice the reduction in thickness of the ears at the side edges thereof will be only about $\frac{1}{32}$ of an inch, although for the purpose of illustrating this bevel in the drawing, it has been somewhat exaggerated. This construction provides ample clearance between the ears and the bearing portions of the ring at the points where the greatest pressure and friction would otherwise occur, and thus effectively prevents overheating of the joint.

In order to prevent the escape of lubricant from the housing 5 through the bushing 8 around the housing pins 9, a cap 19 is threaded on the outer end of each of said bushings and has an internal gasket 20 seating against the end of the bushing.

The connections between the housing 5 and the adjacent parts should be so constructed as to prevent leakage of oil from the housing. It frequently happens, however, that in filling the joint with oil a power oil gun is used which may develop a pressure as great as two thousand pounds. Such a pressure is likely to force the wall of the housing outwardly and to disrupt the oil seal, resulting in a leaky joint. In order to make it impossible for such a condition to occur, I have provided means for relieving the internal pressure before any damage can occur. For this purpose the pin 9 is provided with a central longitudinal bore 21 which has a lateral branch 22 extending from the center of the joint. A valve housing 23 is mounted in this branch 22, preferably having a threaded connection therewith. The valve housing 23 has a port which is adapted to be closed by a ball valve 24, the latter being held normally closed by a spring 25.

With the above described construction, when oil is being supplied to the joint, as the oil level rises above the center of the housing air is trapped in the upper part of the housing. As more oil is forced into the housing this air is compressed, and when the pressure reaches a predetermined point, the valve 24 opens and oil begins to run out through the bore 21. This prevents the pressure within the housing from becoming too great and apprises the attendant of the fact that no more oil is required. As soon as the joint begins to rotate the oil is thrown outwardly by centrifugal force away from the valve, so that no more oil can escape. The first whirl of the joint throws the small surplus of oil out through the bore 21. During the rotation of the joint, the centrifugal force causes the oil to form a layer about the inside surface of the housing, leaving an air space in the center. If heat causes the air to exert an excessive expansive pressure upon the housing, such pressure will be relieved by the valve 24 without allowing any oil to escape.

The provision of the relief valve makes it impossible for a careless or ignorant attendant to cause damage by using too great a pressure in forcing oil into the housing. The valve is so located that it is impossible for oil to leak therefrom after it has been introduced into the housing and the joint is again in operation. Excessive friction is eliminated. The joint is therefore extremely efficient and durable and does not require expert attention.

Although I have shown and described in considerable detail one embodiment of the invention, it is to be understood that various parts thereof may be considerably modified without any material departure from its distinctive features as set forth in the claims.

What I claim is:

1. A universal joint comprising a housing, a pin extending transversely through the housing and having a passageway extending longitudinally throughout its length and open at the ends, the intermediate portion of said passageway communicating with the space enclosed by the housing, and a relief valve normally closing the communication but adapted to be opened by excessive pressure within the housing.

2. A universal joint comprising a housing, a pin extending transversely through the housing and having a passageway extending longitudinally throughout its length and open at the ends, the intermediate portion of said passageway being provided with a port opening into the space enclosed by the housing, a relief valve for controlling the port, and resilient means normally holding said valve closed but yieldable to permit the valve to open in response to excessive pressure within the housing.

3. A universal joint comprising a housing, a pin extending through the housing and having a passageway along the longitudinal axis of the pin and provided with a port through the side of the pin near the center of the housing, a relief valve controlling said port, and means normally holding said relief valve closed but yieldable to permit said valve to open in response to excessive pressure within the housing.

4. A universal joint comprising a housing, a pin extending through the housing and having a passageway disposed longitudinally thereof with a laterally disposed opening communicating with the space enclosed by the housing, a ball valve associated with said laterally disposed opening, and resilient means normally holding said valve in position to close said opening but yieldable to permit the valve to open in response to excessive pressure within the housing.

5. A universal joint comprising a housing, a pin extending from side to side of the housing and having a passageway disposed along the longitudinal axis of the pin from end to end thereof and provided with a lateral branch constituting a port communicating with the space enclosed by the housing near the center thereof, a relief valve controlling said port, and resilient means normally holding said relief valve closed but yieldable to permit the valve to open in response to excessive pressure within the housing.

6. A universal joint comprising a housing provided with a port located in the vicinity of the axis of the joint, so that when the port is covered by lubricant a substantial volume of air will be trapped in the housing, a normally closed relief valve controlling said port and yieldable, only when lubricant is forced into the housing with excessive pressure, to allow a sufficient amount of said lubricant to escape to prevent the pressure from opening the seams of the joint.

7. A universal joint comprising a housing into which lubricant may be forced by pressure, said housing having relatively movable parts adapted to be secured to the shaft sections which are to be connected, a passageway leading from a point within the housing near the longitudinal axis thereof directly to a point outside the housing, and a relief valve normally closing said pasageway but adapted to be opened by excessive pressure within the housing, to permit lubricant to escape therefrom.

8. A universal joint comprising a housing with relatively movable parts adapted to be secured to the shaft sections which are to be connected, a passageway leading from a point within the housing near the longitudinal axis thereof directly to a point outside the housing, and a relief valve normally closing said passageway but adapted to be opened by excessive pressure within the housing, to permit lubricant to escape therefrom, said passageway being disposed transversely to the housing so that centrifugal force will tend to clear the passageway of lubricant when the joint is rotated.

9. A universal joint comprising a housing into which lubricant may be forced under pressure, a passageway through the wall of said housing, and a relief valve normally closing said passageway but adapted to be opened by excessive pressure within the housing, the inner end of said passageway being disposed inwardly of the normal layer of lubricant which is thrown by centrifugal force against the inside face of the housing, when the joint is rotated.

In testimony whereof, I have hereunto signed my name to this specification.

ALFRED W. PLACE.